United States Patent
Lecuyer et al.

(10) Patent No.: US 8,186,939 B2
(45) Date of Patent: May 29, 2012

(54) TURBINE DISC AND RETAINING NUT ARRANGEMENT

(75) Inventors: Daniel Lecuyer, Verdun (CA); Alain Carrieres, Boucherville (CA); Franco Di Paola, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 466 days.

(21) Appl. No.: 12/546,990

(22) Filed: Aug. 25, 2009

(65) Prior Publication Data

US 2011/0052372 A1 Mar. 3, 2011

(51) Int. Cl.
*F03B 3/00* (2006.01)

(52) U.S. Cl. .................. 415/115; 416/204 A

(58) Field of Classification Search .......... 415/115; 416/204 A, 204 R; 60/796, 805
See application file for complete search history.

(56) References Cited

U.S. PATENT DOCUMENTS

| | | | |
|---|---|---|---|
| 3,199,294 A | 8/1965 | Hagen | |
| 3,209,640 A | 10/1965 | Waivers | |
| 3,718,957 A * | 3/1973 | Shank | 29/889.4 |
| 4,292,008 A | 9/1981 | Grosjean et al. | |
| 4,309,145 A | 1/1982 | Viola | |
| 4,730,978 A | 3/1988 | Baran, Jr. | |
| 4,749,298 A | 6/1988 | Bundt et al. | |
| 4,820,097 A | 4/1989 | Maeda et al. | |
| 4,820,116 A | 4/1989 | Hovan et al. | |
| 5,072,785 A | 12/1991 | Dressler et al. | |
| 5,129,447 A | 7/1992 | Hamner | |
| 5,327,719 A * | 7/1994 | Mazeaud et al. | 60/785 |
| 5,537,814 A * | 7/1996 | Nastuk et al. | 60/796 |
| 5,951,250 A * | 9/1999 | Suenaga et al. | 416/96 R |
| 6,151,881 A * | 11/2000 | Ai et al. | 60/805 |
| 6,422,812 B1 | 7/2002 | Pepi et al. | |
| 6,428,272 B1 | 8/2002 | Pepi et al. | |
| 6,532,929 B2 | 3/2003 | Antonevich et al. | |
| 6,941,758 B2 | 9/2005 | Tiemann | |
| 2006/0133924 A1* | 6/2006 | Kanezawa et al. | 415/115 |
| 2007/0286733 A1* | 12/2007 | Bouchard | 416/204 R |
| 2011/0052372 A1* | 3/2011 | Lecuyer et al. | 415/115 |
| 2011/0081253 A1* | 4/2011 | Lecuyer et al. | 416/96 R |

* cited by examiner

*Primary Examiner* — Edward Look
*Assistant Examiner* — Christopher R Legendre
(74) *Attorney, Agent, or Firm* — Norton Rose Canada LLP

(57) ABSTRACT

A turbine rotor for a gas turbine engine including a disc having a hub defining a central bore for receiving an engine shaft. A nut retains the disc on the shaft. The disc retaining nut has at least one cooling passage defined therein and disposed for directing a flow of cooling air passing through the bore of the disc.

12 Claims, 2 Drawing Sheets

TURBINE DISC AND RETAINING NUT ARRANGEMENT

TECHNICAL FIELD

The application relates generally to gas turbine engines and, more particularly, to turbine rotor assemblies.

BACKGROUND OF THE ART

High temperature resistant materials, such as nickel based superalloys, have been used in the past in the manufacturing of gas turbine discs and the like. While superalloy materials, like IN100 and ME16, have better strength at high temperatures, they are more brittle and, thus, less tolerant to damage than conventional turbine disc materials. Therefore, when designing engine parts made out of such materials care should be taken to minimize stress concentrations, such as provided by holes, sharp corners, etc.

Accordingly, there is a continuing need to address the design constrains presented by damage-sensitive materials in the design of gas turbine engine parts, such as turbine discs.

SUMMARY

In one aspect, there is provided a turbine rotor for a gas turbine engine, comprising a disc including front and rear axially facing sides extending radially outwardly from a hub to a rim, the hub defining a central bore through which an engine shaft extends, and a disc retaining nut mounted around a portion of the engine shaft for mounting the disc on the engine shaft, the disc retaining nut having a plurality of cooling passages defined therein around a periphery of the nut, and the nut disposed in a cooling flow path defined centrally through the disc, the cooling passages communicating with the flow path for directing a flow of cooling air in the cooling path though the nut.

In a second aspect, there is provided a turbine rotor for a gas turbine engine, comprising an engine shaft mounted for rotation about a central axis of the gas turbine engine, a turbine disc mounted to the engine shaft for rotation therewith, and a nut threadably engaged on the engine shaft for mounting the disc on the engine shaft, the nut having a series of cooling passages defined therein and in fluid flow communication with a central bore of the disc.

DESCRIPTION OF THE DRAWINGS

Reference is now made to the accompanying figures, in which.

DETAILED DESCRIPTION OF THE PREFERRED EMBODIMENTS

Figure 1:
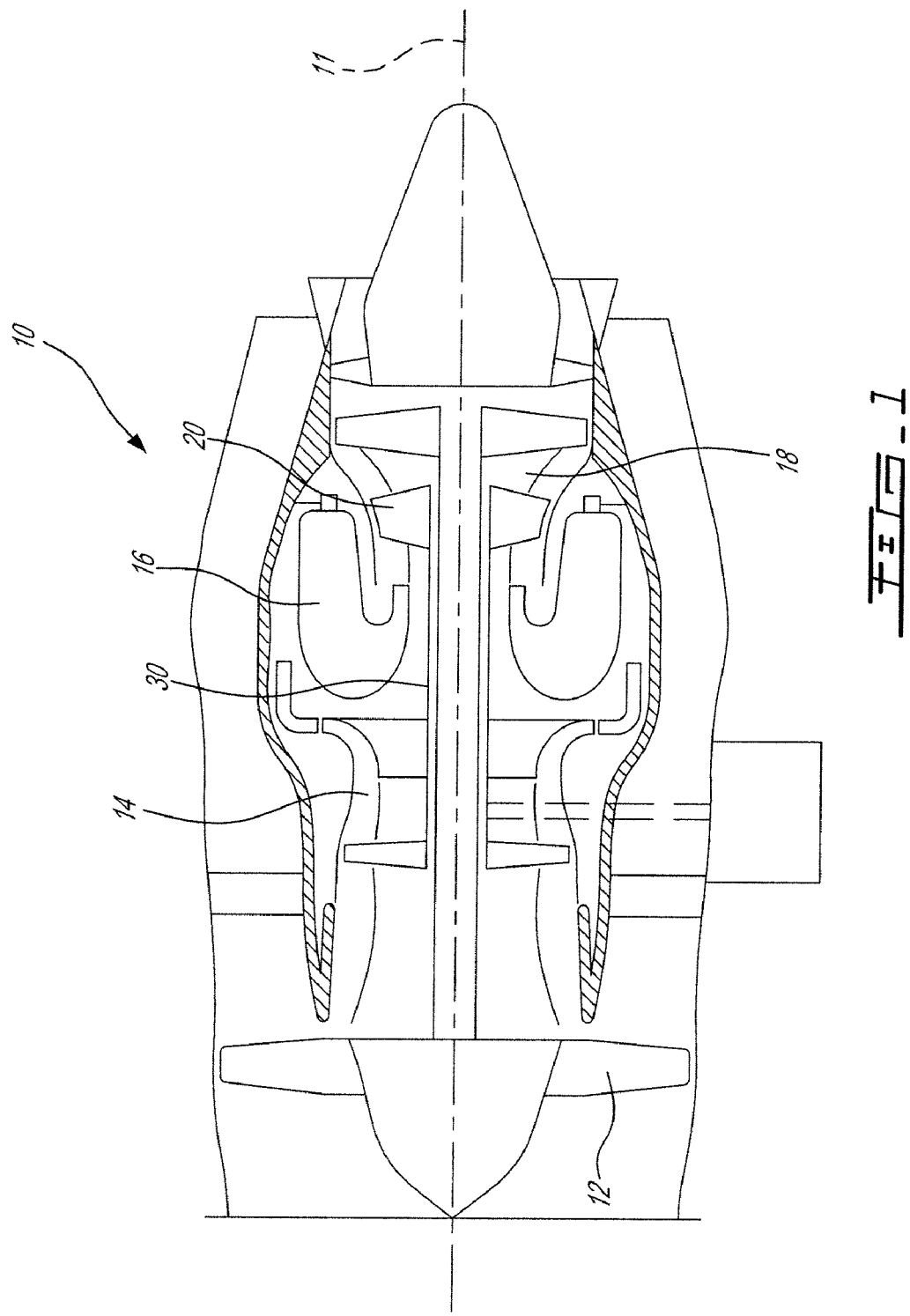
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
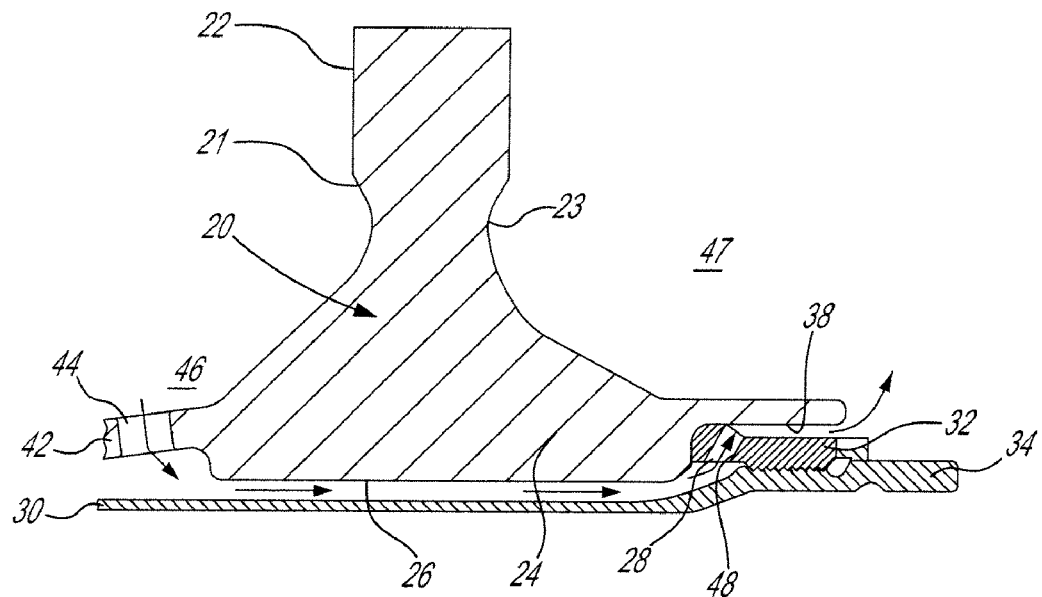
FIG. 2 is an enlarged cross-sectional view of a turbine rotor of the engine shown in FIG. 1.

As shown in FIG. 2, the turbine section 18 comprises, among others, a high pressure rotor disc 20 having front and rear axially facing sides 21 and 23 extending radially inwardly from a rim 22 to a thinner web terminating in a larger hub 24. The hub 24 includes a central bore 26, and a row of turbine blades (not shown) extends radially outwardly from the rim 22 of the turbine disc 20. The disc 20 may be made of a high temperature resistant superalloy, such as IN100 and ME16.

A hollow engine shaft 30 extends axially through the central bore 26 of the disc 20. According to the example illustrated in FIG. 1, the shaft 30 interconnects the high pressure turbine rotor to a high pressure rotor of the compressor 14, thereby forming the high pressure spool of the engine 10. As shown in FIG. 2, a disc retaining nut 32 is threadably engaged to the engine shaft—in this example, on a rear tie-shaft portion 34 of the engine shaft 30 for axially loading the disc 20 on the shaft 30. The nut 32 in this example contributes to axially hold the components of the complete high pressure rotor stack all together.

Figure 3:
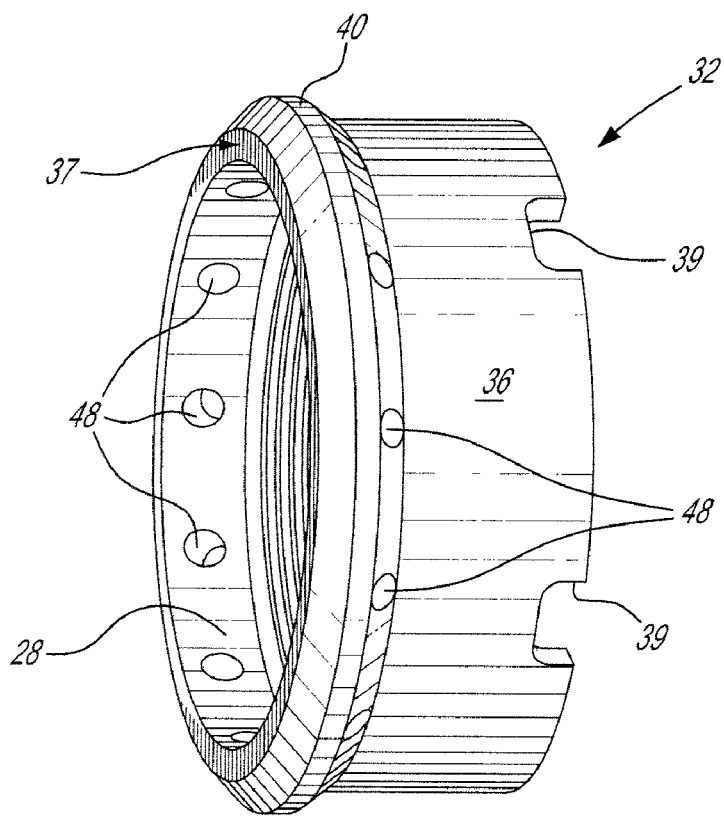
FIG. 3 is an isometric view of a disc retaining nut forming part of the turbine rotor shown in FIG. 2.

As shown in FIGS. 2 and 3, the nut 32 has an axially extending tubular open ended body 36 adapted to be concentrically nested in a rear recess 38 defined in an axially rearwardly projecting shaft portion of the rotor disc hub 24. The rear recess forms an enlarged rear end portion of the central bore. Inner threads are provided on the inner surface of the tubular body 36 for engagement with corresponding outer threads on the rear tie-shaft portion 34 of the engine shaft 30. The nut 32 has a flange 40 extending radially outwardly from the front end of the tubular body 36 and having a frontal face 37 for axial abutment against a corresponding annular shoulder 41 defined in the rear recess 38 of the rearwardly projecting shaft portion of the rotor disc hub 24. As shown in FIG. 3, rectangular notches 39 or the like may be circumferentially distributed along the rear edge of the tubular body 36 of the nut 32 for engagement with a tool (not shown) used for tightening the nut 32 on the shaft 30.

As shown in FIG. 2, the disc hub 24 has an axially forwardly projecting shaft portion 42. The forwardly projecting shaft portion 42 offers sufficient material to accommodate a series of cooling holes 44 which can be made large enough to avoid the formation of unacceptable stress concentrations in "damage-intolerant" disc materials, such as IN100 and ME16. Accordingly, the large cooling holes 44 are sized to avoid unacceptable stress concentrations in the rotor disc 20 and are uniformly circumferentially distributed on the forwardly projecting shaft portion 42. The large cooling holes 44 are in fluid flow communication with the front cavity 46 of the rotor disc 20. High pressure air may be bled from the compressor 14 and channelled to the front cavity 46 of the rotor disc 20 and the cooling holes 44 to cool down the front area of the disc 20 during engine operation. It is understood that other suitable sources of coolant could be used to provide disc cooling. As indicated by the arrows in FIG. 2, the cooling air exiting the holes 44 is directed axially through the central bore 26 of the disc 20 in the annular spaced defined between the engine shaft 30 and the boundary surface of the central bore 26. The cooling air flowing through the central bore 26 is received in the rear recess 38 defined in the axially rearwardly projecting shaft portion of the rotor disc hub 24. The cooling air is discharged from the rear recess 38 in the rear cavity 47 of the disc 20 via a series of circumferentially spaced-apart cooling passages 48 defined in the front end portion of the disc retaining nut 32. The nut 32 thus acts as a cooling air nozzle as well as a fastener.

By providing the cooling passages 48 in the nut 32 instead of in the axially rearwardly projecting shaft portion of the disc 20 the overall stress concentration in the disc 20 can be reduced while still providing cooling to the rear area of the disc. The rearwardly projecting shaft portion of the disc may be free from any cooling holes. Also the cooling passages 48 can be made small enough to perform a flow metering role. If the cooling passages 48 were defined in the rearwardly projecting shaft portion of the disc 20, the passages would have to be large enough to avoid stress concentrations and could thus not be designed as small flow metering holes. The provision of small flow metering holes in a "damage intolerant" material would create stress concentrations which could render the rotor disc prone to crack propagation. The provision of the cooling passages in the nut 32 also allows providing cooling air passages where the space constraints are too restrictive to incorporate large cooling holes sized to avoid stress concentrations in the "intolerant damage" disc. This provides a design option where there is not enough space for large holes and the disc material does not accommodate small holes. In this way, the size of the disc can be minimized. Also by incorporating, the cooling passages 48 in the nut 32, there is no need to provide separate or additional pieces to convey the cooling air to the rear cavity 47 of the disc 20.

According to the illustrated embodiment, each cooling passages 48 is provided in the form of a metering hole extending thicknesswise through a portion of the lip 40 of the nut 32 overhanging the shaft/thread engagement portion. The overhang may permit, as in this example, the cooling passages 48 to extend from a radially inner surface 28 to a radially outer surface of the nut 32 in a rearwardly inclined direction. The entrances to cooling passages 48 are disposed on a radially inner surface relative to the nut abutment face 37 in this example. However, it is understood that the cooling passages 48 may take any suitable form, including slots or grooves defined in the nut 32 which, at the interface with the disc 20 for example, would thus provide cooling passages 48. The cooling passages 48 can be made in any suitable manner. The number and size of passages 48 may be adjusted to limit and/or direct the flow as desired.

The above description is meant to be exemplary only, and one skilled in the art will recognize that changes may be made to the embodiments described without departing from the scope of the invention disclosed. For example, any arrangement of cooling passages passing through the nut may be provided. Rather than fully contained holes through the nut, the passages may be provided as exterior slits which cooperate with another surface (such as the disc) to provide the cooling passages. Any suitable cooling scheme may be provided for feeding the cooling passages. Cooling passages may be integrated in a front disc retaining nut. Although demonstrated above in use with a tie-shaft arrangement, the concept may be applied with any suitable arrangement. Still other modifications which fall within the scope of the present invention will be apparent to those skilled in the art, in light of a review of this disclosure, and such modifications are intended to fall within the appended claims.

What is claimed is:

1. A turbine rotor for a gas turbine engine, comprising a disc including front and rear axially facing sides extending radially outwardly from a hub to a rim, the hub defining a central bore through which an engine shaft extends, and a disc retaining nut mounted around a portion of the engine shaft for mounting the disc on the engine shaft, the disc retaining nut having a plurality of cooling passages defined therein around a periphery of the nut, and the nut disposed in a cooling flow path defined centrally through the disc, the cooling passages communicating with the flow path for directing a flow of cooling air in the cooling path through the nut.

2. The turbine rotor defined in claim 1, wherein the disc retaining nut and shaft are respectively configured such that a portion of the nut overhangs the shaft in a manner which permits the cooling air to access a radially inner surface of the nut, and wherein the cooling passages have an entrance disposed on the radially inner surface.

3. The turbine rotor defined in claim 1, wherein the disc has a rear cavity on the rear axially facing side thereof, and wherein the disc retaining nut is disposed axially aft of the disc, the at least one cooling passage in the disc retaining nut being in fluid flow communication with the rear cavity of the disc.

4. The turbine rotor defined in claim 1, wherein the cooling passages defined in the disc retaining nut are disposed to direct the cooling air from the central bore of the disc to a rear cavity provided on the rear axially facing side of the disc.

5. The turbine rotor defined in claim 1, wherein the cooling passages defined in the nut comprises a circumferential array of flow metering holes extending through a tubular body of the nut.

6. The turbine rotor defined in claim 1, wherein the disc retaining nut is received in a recess defined in a rearwardly extending shaft portion of the disc, the nut axially abutting a shoulder in the rearwardly extending shaft portion of the disc, the at least one cooling passage comprising a series of circumferentially distributed holes extending from a radially inner surface to a radially outer surface of the nut.

7. A turbine rotor for a gas turbine engine, comprising an engine shaft mounted for rotation about a central axis of the gas turbine engine, a turbine disc mounted to the engine shaft for rotation therewith, and a nut threadably engaged on the engine shaft for mounting the disc on the engine shaft, the nut having a series of cooling passages defined therein and in fluid flow communication with a central bore of the disc.

8. The turbine rotor defined in claim 7, wherein said nut is disposed on one side of the turbine disc, and wherein the disc is free from cooling holes on said one side.

9. The turbine rotor defined in claim 7, wherein the cooling passages are provided in the form of flow metering holes extending from a radially inner surface to a radially outer surface of the nut.

10. The turbine rotor defined in claim 7, wherein the nut is received in a rear portion of the disc central bore, the cooling passages in the nut also being in fluid flow communication with a rear portion of the disc.

11. The turbine rotor defined in claim 10, wherein the nut has a front end which is axially abutted against an axially facing shoulder provided in said rear enlarged portion of the central bore.

12. The turbine rotor defined in claim 7, wherein the nut and shaft are respectively configured such that a portion of the nut overhangs the shaft in a manner which permits cooling air passing through the disc bore to access a radially inner surface of the nut, and wherein the cooling passages have an entrance disposed on the radially inner surface.

* * * * *